UNITED STATES PATENT OFFICE.

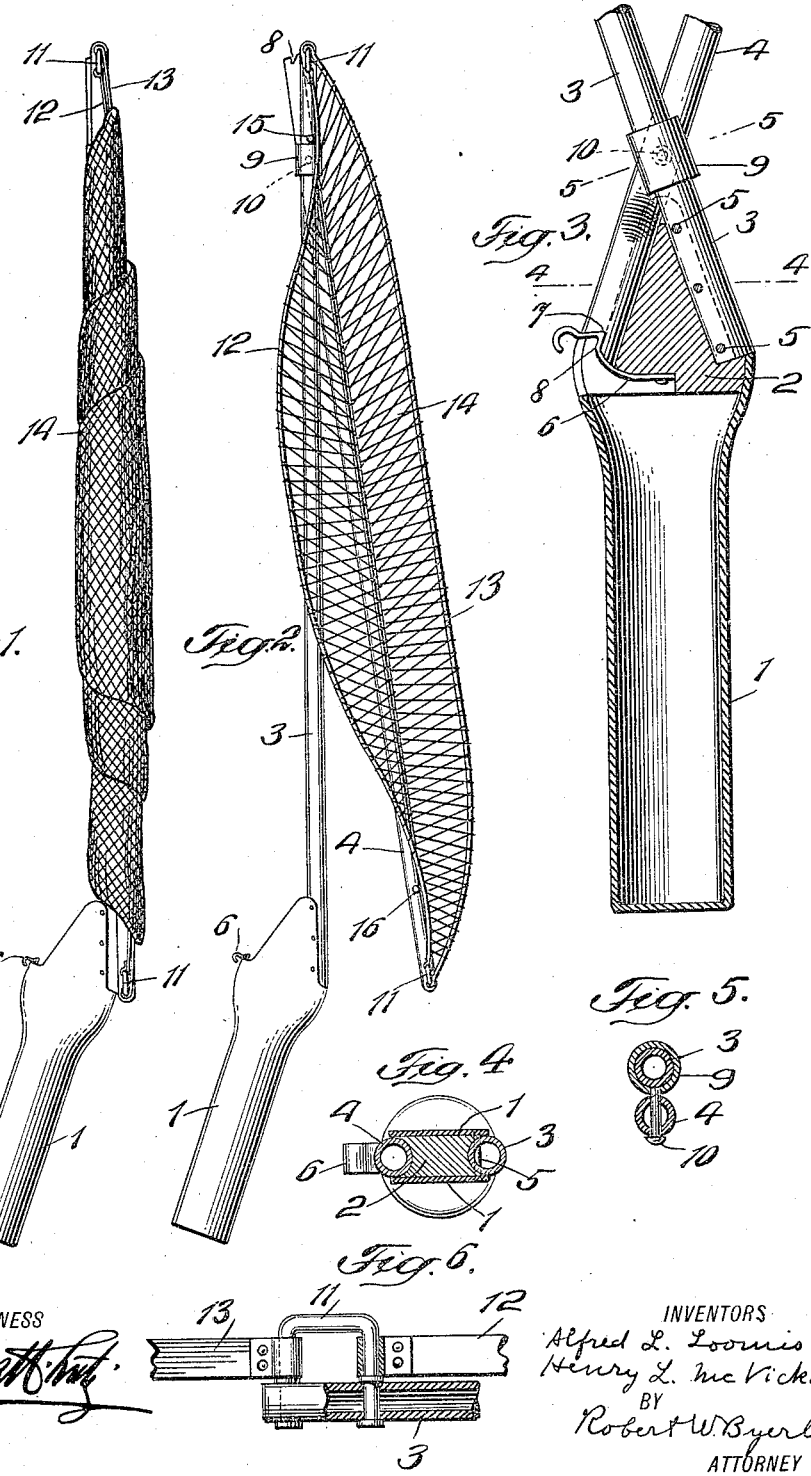

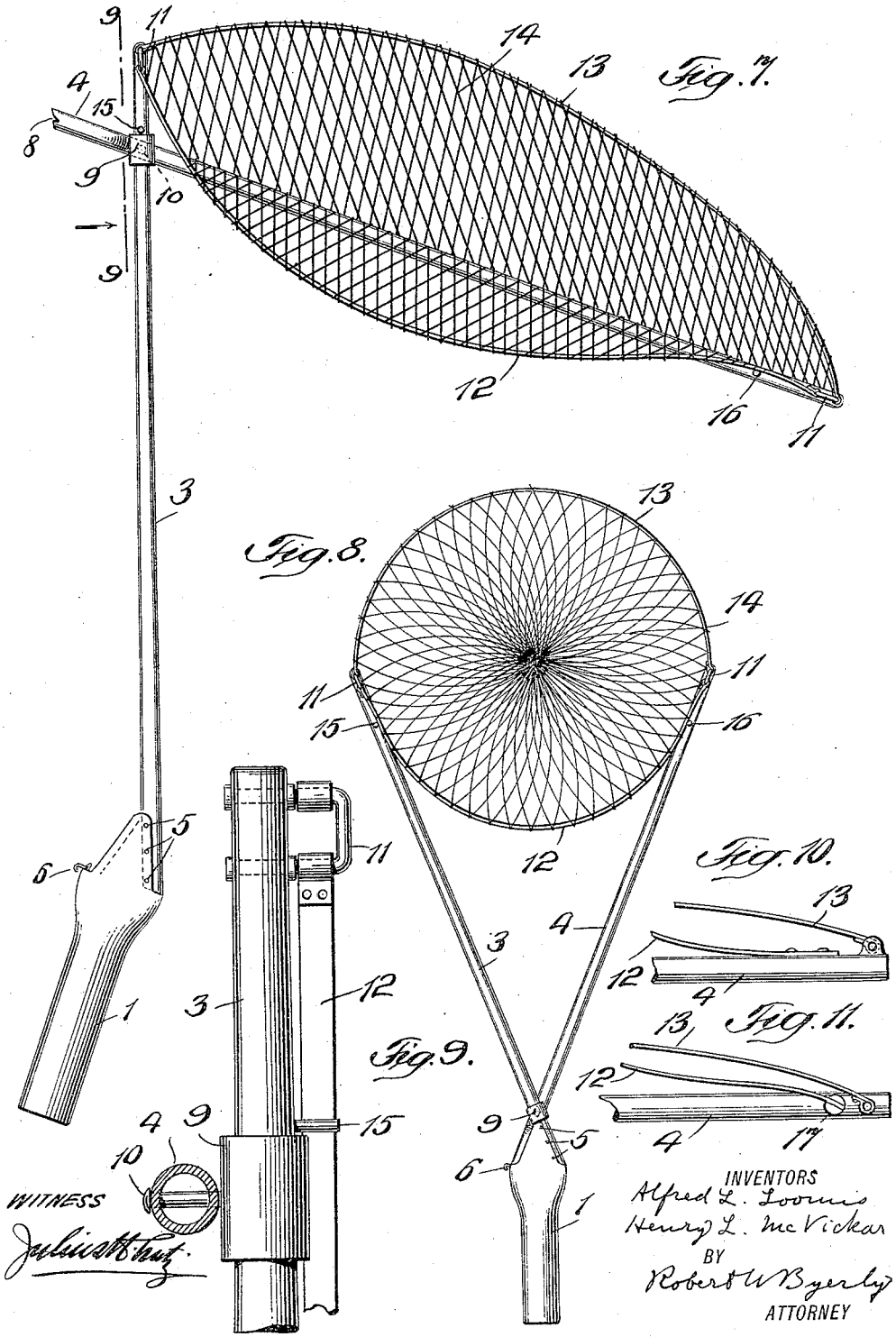

ALFRED L. LOOMIS AND HENRY L. McVICKAR, OF TUXEDO PARK, NEW YORK.

NET.

1,184,466.  Specification of Letters Patent.  Patented May 23, 1916.

Application filed October 12, 1915. Serial No. 55,368.

*To all whom it may concern:*

Be it known that we, ALFRED L. LOOMIS and HENRY L. MCVICKAR, citizens of the United States, residing at Tuxedo Park, in Orange county, in the State of New York, have invented new and useful Improvements in Nets, of which the following is a specification.

This invention relates to nets, and particularly to that class of nets which are used in rod fishing to net the fish after it has been played.

The principal object of our invention is to provide a simple and convenient self-opening net. Our net in folded position is held in a case or scabbard hung from the angler's belt while the fish is hooked and played. When the fish is worked in to where it may be netted, the angler need only grasp the handle of our net with one hand and withdraw it from the scabbard, and the net will automatically open so that it is ready for instant use in netting the fish.

One embodiment of our invention is illustrated in the accompanying drawings, in which—

Figure 1 is a top view of the net in folded position; Fig. 2 is a top view of the net just as it starts to open; Fig. 3 shows a longitudinal section of the handle of the net in open position; Fig. 4 is a transverse section of the handle and rods on the line 4—4 of Fig. 3; Fig. 5 is a transverse section taken on the line 5—5 of Fig. 3, and showing the sliding connection between the two rods; Fig. 6 shows the one way in which the springs may be fastened to the rods; Fig. 7 is a top view of the net in half opened position; Fig. 8 is a top view of the net in fully opened position; Fig. 9 is a sectional view taken on line 9—9 in Fig. 7, looking in the direction of the arrow; Fig. 10 is a partial view of a modification showing another way of fastening the springs to the rods; Fig. 11 is a similar view of another modification, showing a third way in which the springs may be fastened to the rods.

In the form illustrated in the drawings, the framework consists of the handle 1, and the rods 3, 4. The handle and rods are preferably hollow, and the rods may taper slightly as illustrated in the drawings. For convenience in nomenclature, we shall throughout our specification and claims refer to the ends of the rods 3, 4, which point away from the user when the net is open (Fig. 8) as the "outer" ends, and to the opposite ends of these rods as the "inner" ends. In the upper end of this handle 1 is fastened a solid block of metal 2 (Fig. 3), which is V-shaped. The two converging sides of the block 2 are grooved for the reception of the inner ends of the rods 3, 4 (Fig. 4). The inner end of the rod 3 is rigidly attached to block 2 by means of the rivets 5. Attached to the inner side of the block 2 is a spring or catch 6, which has a projection 7 engaging a groove 8 in the inner end of the rod 4, when the net is in opened position. The rod 4, near its inner end, is slidably connected with rod 3 by means of the sleeve 9 and the pin 10 (Fig. 5).

The springs 12, 13. from which the netting 14 is suspended, are normally curved and supply the power necessary to open the net. The spring 12 is sufficient of itself to open the net, but it is assisted to some extent by the spring 13. The spring 13 may be pivotally attached to the outer ends of the rods 3, 4 by means of the staple 11, (Fig. 6). The spring 12 may be pivotally attached to the outer end of the rod 3 by means of the staple 11 (Fig. 6). The other end of the spring 12 is attached to the outer end of the rod 4 in such a way that it can exert a torque upon said rod at its outer end, that is to say, it is rigidly attached so that a portion of the spring near its end is maintained in fixed relation to the rod 4 throughout the operation of the device. Various forms of rigid connection may be used. In the form illustrated in Figs. 1–9, the end of the spring is pivotally fastened to the staple 11, while a point on the spring a short distance inward from its end constantly presses against an upwardly projecting pin 16 in the rod 4. The spring 12 can, if desired, be attached to this pin or passed through a slot in it, but this is unnecessary, as the curvature of the spring holds it constantly against the pin so that the arrangement described in effect produces a rigid connection between the end of the spring 12 and the rod 4. The pin 16 may be dispensed with, provided the end of the spring 12 is rigidly attached to rod 4 by other means, as, for example, by passing it through a slot in an upwardly projecting post 17 in rod 4 (Fig. 11). If preferred, the spring 12 may be attached to the side of the rod 4 instead of to means projecting upwardly from the rod. The end of the spring 12 may be riveted to the side of the rod, as shown in Fig. 10. Or spring 12 may be pivotally connected at the side of the rod (like spring 13 in Fig. 10), as this will produce what is in effect a rigid connection between the rod and the spring, since the normal curvature of the spring will press it against the side of the rod at points spaced inwardly from the point of connection, just as the normal curvature keeps the spring pressed against the pin 16, in the form shown in Fig. 1–9.

An upwardly projecting pin 15 may, if desired, be placed near the outer end of rod 3. This pin, while not essential to the operation of the device, has the effect of pressing in the portion of the spring 12 which is near the end connected to the rod 3 when the net is in open position (Fig. 8), so that this spring forms a symmetrical curve when the net is open. The pressure of the spring 12 against the pin 15 also helps somewhat in opening the net (see Fig. 2), but it is not essential for this purpose. As the spring 12 swings away from the pin 15 in the operation of opening and closing the net (Fig. 7), the pin 15 does not have the effect of forming a rigid connection between the spring 12 and the rod 3.

The operation of our self-opening net is as follows:—During the hooking and playing of the fish, the net may be held in a scabbard swung from the belt in folded position, as shown in Fig. 1. In this position the rods 3 and 4 lie side by side, and the netting 14 is wrapped around them. When it is time to net the fish, the net is grasped with one hand by the handle 1 and withdrawn from the scabbard. The net is then waved in air in such a way as to unwind the netting 14 from the rods 3 and 4, and held in such a position that the rods 3, 4 are substantially horizontal. As soon as the netting is unwound, the pull of the normally curved springs 12 and 13 upon the outer end of the rod 4, assisted by the pressure of the spring 12 against the pin 15 (although this latter force is not necessary to the operation), causes the outer end of the rod 4 to swing away from the inner end of the rod 3 (Figs. 2 and 7). When the rod 4 has reached a position about perpendicular to rod 3, the torque exerted by the spring 12, at the outer end of rod 4, causes the inner end of rod 4 to slide inwardly along rod 3 until rod 4 reaches the position shown in Figs. 8 and 3. Although the propelling force of the spring 12 is slight during the last part of this movement, the momentum acquired by the rod 4 during the first part of this movement is sufficient to carry the inner end of the rod 4 home against the block 2, where it is caught and held firmly in place by the catch 6.

To re-fold the net, it is simply necessary to press the outer end of the catch 6 to release the inner end of the rod 4. The sleeve 9 is then slid outwardly on the rod 3 as far as the pin 15, and the outer end of the rod 4 is drawn downwardly toward the inner end of the rod 3. The rod 4 is held in this position while the net is waived in air in such a way as to wind the netting 14 around the rods 3 and 4. When the netting is so wound, it holds the rods in closed position, as shown in Fig. 1.

Many changes may be made in the form of our net as shown and described without departing from our invention. Thus the springs 12 and 13 may be made of several superimposed strips of metal instead of a single piece as illustrated. The handle 1 may be solid, if preferred, and may be of any desired shape. Other forms of catch may be substituted for the form shown at 6. Other forms of sliding connection between the inner end of rod 4 and rod 3 may be substituted for the sleeve and pin.

We claim as our invention:—

1. A self-opening net comprising a rod, a second rod slidably connected near its inner end to said first mentioned rod, normally curved springs connecting the outer ends of said rods, and a netting suspended from said springs.

2. A self-opening net comprising a handle, a rod rigidly connected at its inner end to said handle, a second rod slidably connected near its inner end with said first mentioned rod, normally curved springs connecting the outer ends of said rods, and netting suspended from said springs.

3. A self-opening net comprising a handle, a rod rigidly connected to said handle at its inner end, a second rod slidably connected near its inner end with said first mentioned rod, springs connecting the outer ends of said rods, a netting suspended from said springs, and a spring-catch arranged to hold the inner end of said second rod against said handle.

4. A self-opening net comprising a rod, a second rod slidably connected near its inner end to said first mentioned rod, a normally inwardly curved spring having one of its ends pivotally connected to the outer end of said first mentioned rod and its other end rigidly connected to the outer end of said second mentioned rod, a normally outwardly curved spring having its ends pivotally connected to the outer ends of said rods, and a netting suspended from said springs.

5. In a self-opening net, a rod, a second rod slidably connected near its inner end with said first mentioned rod, a normally curved spring having one of its ends connected to the outer end of said first mentioned rod and its other end connected to the outer end of the said second mentioned rod and arranged to exert a torque at the outer end of said rod.

6. In a self-opening net, a rod, a second rod slidably connected near its inner end with said first mentioned rod, a normally curved spring having one of its ends connected to the outer end of said first mentioned rod, and having the other of its ends connected to the outer end of said second mentioned rod and arranged to exert pressure against said second mentioned rod at points spaced inwardly from the point of said connection.

7. In a self-opening net, a rod, a second rod slidably connected near its inner end with said first rod, a pin in said second mentioned rod near its outer end, and a normally curved spring connecting the outer ends of said rods and bearing against said pin.

8. In a self-opening net, a rod, a second rod slidably connected near its inner end to said first mentioned rod, a normally curved spring having one of its ends connected to the outer end of said first mentioned rod and its other end connected to the outer end of said second mentioned rod and arranged to exert pressure against said rods at points spaced inwardly from the points of said connections.

ALFRED L. LOOMIS.
HENRY L. McVICKAR.

Copies of this patent may be obtained for five cents each, by addressing the "Commissioner of Patents, Washington, D. C."